United States Patent [19]
Brown et al.

[11] Patent Number: 6,141,661
[45] Date of Patent: *Oct. 31, 2000

[54] METHOD AND APPARATUS FOR PERFORMING A GRAMMAR-PRUNING OPERATION

[75] Inventors: Deborah W. Brown, Manalapan; Randy G. Goldberg, Princeton; Edward Dennis Haszto, Basking Ridge; Stephen Michael Marcus, Atlantic Highlands; Richard R. Rosinski, Middletown, all of N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/953,468

[22] Filed: Oct. 17, 1997

[51] Int. Cl.⁷ .................................................. G06F 17/30
[52] U.S. Cl. ........................................ 707/104; 364/146
[58] Field of Search .................. 707/1–10, 100–104, 707/200–206, 514, 531, 500, 532; 364/132, 146, 188; 362/85, 233; 704/2, 9

[56] References Cited

U.S. PATENT DOCUMENTS

| | | | |
|---|---|---|---|
| 3,466,394 | 9/1969 | French .......................... | 179/1 |
| 3,752,904 | 8/1973 | Waterbury ................... | 178/5.1 |
| 3,896,266 | 7/1975 | Waterbury .................... | 179/1 |
| 3,988,715 | 10/1976 | Mullan et al. ............... | 382/228 |
| 4,718,102 | 1/1988 | Crane et al. ................. | 382/13 |
| 4,783,804 | 11/1988 | Juang et al. ................. | 704/245 |
| 4,819,271 | 4/1989 | Bahl et al. ................... | 704/256 |
| 4,908,865 | 3/1990 | Doddington et al. ...... | 704/272 |
| 5,023,912 | 6/1991 | Segawa ....................... | 381/43 |
| 5,027,406 | 6/1991 | Roberts et al. ............. | 381/43 |
| 5,034,989 | 7/1991 | Loh ............................. | 382/189 |
| 5,101,345 | 3/1992 | MacPhail .................... | 707/1 |
| 5,125,022 | 6/1992 | Hunt et al. .................. | 379/88 |
| 5,127,043 | 6/1992 | Hunt et al. .................. | 379/88 |
| 5,167,016 | 11/1992 | Bagley et al. .............. | 395/144 |
| 5,179,718 | 1/1993 | MacPhail .................... | 707/514 |
| 5,216,720 | 6/1993 | Naik et al. .................. | 704/272 |
| 5,255,310 | 10/1993 | Kim et al. .................. | 379/88 |
| 5,274,560 | 12/1993 | LaRue ......................... | 364/444 |
| 5,283,833 | 2/1994 | Church et al. .............. | 381/41 |
| 5,297,194 | 3/1994 | Hunt et al. .................. | 379/88 |
| 5,303,299 | 4/1994 | Hunt et al. .................. | 379/88 |
| 5,365,574 | 11/1994 | Hunt et al. .................. | 379/88 |
| 5,384,833 | 1/1995 | Cameron ..................... | 704/275 |
| 5,418,717 | 5/1995 | Su et al. ..................... | 364/419.08 |

(List continued on next page.)

FOREIGN PATENT DOCUMENTS

| | | |
|---|---|---|
| 0 319 193 A2 | 6/1989 | European Pat. Off. . |
| WO 96 10795 | 4/1996 | WIPO . |
| 96 36042 | 11/1996 | WIPO . |

OTHER PUBLICATIONS

L.G. Kersta; "Voiceprint Identification"; Bell Telephone Laboratories, Inc., Murray Hill, NJ; Nature; Dec. 29, 1962; pp. 1253–1257.

Joseph P. Campbell, Jr.; "Speaker Recognition: A Tutorial"; Proceedings of the IEEE, vol. 85, No. 9, Sep. 1997; pp. 1437–1462.

Primary Examiner—Ruay Lian Ho

[57] ABSTRACT

A method and apparatus for recognizing an input identifier by comparing a recognized identifier based on the input identifier to a set of reference identifiers maintained in memory. When a match is found between the recognized identifier and one of the reference identifiers, a user is prompted with the matched reference identifier. If the user confirms that the matched reference identifier corresponds to the input identifier, a transaction is executed based on the matched reference identifier. If the user rejects the matched reference identifier, the recognized identifier is compared again to the set of reference identifiers, but for this comparison, the previously rejected reference identifier has been excluded from the set of reference identifiers.

28 Claims, 3 Drawing Sheets

U.S. PATENT DOCUMENTS

| | | | |
|---|---|---|---|
| 5,452,397 | 9/1995 | Ittycheriah et al. | 395/2.49 |
| 5,454,062 | 9/1995 | LaRue | 395/2.63 |
| 5,455,889 | 10/1995 | Bahl et al. | 704/236 |
| 5,465,290 | 11/1995 | Hampton et al. | 379/88.02 |
| 5,497,319 | 3/1996 | Chong et al. | 364/419.02 |
| 5,499,288 | 3/1996 | Hunt et al. | 379/88 |
| 5,502,774 | 3/1996 | Bellegarda et al. | 382/159 |
| 5,504,805 | 4/1996 | Lee | 379/67 |
| 5,509,104 | 4/1996 | Lee et al. | 395/2.65 |
| 5,517,558 | 5/1996 | Schalk | 379/88 |
| 5,519,786 | 5/1996 | Courtney et al. | 382/159 |
| 5,526,465 | 6/1996 | Carey et al. | 704/250 |
| 5,535,120 | 7/1996 | Chong et al. | 364/419.03 |
| 5,566,272 | 10/1996 | Brems et al. | 704/231 |
| 5,577,164 | 11/1996 | Kaneko et al. | 704/275 |
| 5,613,109 | 3/1997 | Yamauchi et al. | 707/104 |
| 5,623,578 | 4/1997 | Mikkilineni | 704/255 |
| 5,623,609 | 4/1997 | Kaye et al. | 704/1 |
| 5,640,490 | 6/1997 | Hansen et al. | 704/254 |
| 5,642,519 | 6/1997 | Martin | 704/9 |
| 5,675,647 | 10/1997 | Garneau et al. | 380/20 |
| 5,675,704 | 10/1997 | Juang et al. | 704/246 |
| 5,675,706 | 10/1997 | Lee et al. | 704/256 |
| 5,677,989 | 10/1997 | Rabin et al. | 392/2.55 |
| 5,680,509 | 10/1997 | Gopalakrishnan et al. | 704/270 |
| 5,687,287 | 11/1997 | Gandhi et al. | 704/247 |
| 5,745,555 | 4/1998 | Mark | 379/93.03 |
| 5,754,695 | 5/1998 | Kuo et al. | 382/228 |
| 5,764,799 | 6/1998 | Hong et al. | 382/225 |
| 5,769,527 | 6/1998 | Taylor et al. | 362/85 |
| 5,794,042 | 8/1998 | Terada et al. | 395/701 |
| 5,797,123 | 8/1998 | Chou et al. | 704/256 |
| 5,806,040 | 9/1998 | Vensko | 704/273 |
| 5,832,063 | 11/1998 | Vysotsky et al. | 379/88 |
| 5,875,108 | 2/1999 | Hoffberg et al. | 364/146 |
| 5,913,196 | 6/1999 | Talmor et al. | 704/270 |
| 5,937,385 | 8/1999 | Zadrozny et al. | 704/257 |

METHOD AND APPARATUS FOR PERFORMING A GRAMMAR-PRUNING OPERATION

CROSS-REFERENCE TO RELATED APPLICATIONS

The present application is related to the following commonly assigned U.S. patent applications: Ser. No. 08/763,382, filed Dec. 13, 1996, entitled "Statistical Database Correction Of Alphanumeric Account Numbers For Speech Recognition And Touch-Tone Recognition;" Ser. No. 08/771,356, filed Dec. 16, 1996, entitled "Constrained Alpha-Numerics For Accurate Account Number Recognition;" Ser. No. 08/909,199, filed Aug. 11, 1997, entitled "A Confusion Matrix Based Method And System For Correcting Misrecognized Words Appearing In Documents Generated By An Optical Character Recognition Technique;" Ser. No. 08/909,200, filed Aug. 11, 1997, entitled "Method And Apparatus For Performing An Automatic Correction Of Misrecognized Words Produced By An Optical Character Recognition Technique By Using A Hidden Markov Model Based Algorithm;" and Ser. No. 08/953,579, entitled "Method And Apparatus For Accessing Pre-Defined Grammars," and Ser. No. 08/953,469, entitled "Method And Apparatus For Minimizing Grammar Complexity," filed concurrently herewith.

BACKGROUND INFORMATION

The present invention is directed to a method and apparatus that matches a recognized identifier based on a user-provided identifier to a reference identifier that is selected from a global set of reference identifiers, and, in particular, to a method and apparatus that prunes the set of reference identifiers each time a user rejects a matched reference identifier by excluding the rejected reference identifier from being compared to the recognized identifier in a subsequent comparison.

Most institutions, such as banks, department stores, and airlines, allow customers to access over the telephone a wide variety of services and information. Before the advent of touch-tone telephones, a customer would obtain these services and information through interacting with a live operator. As touch-tone telephones became more prevalent in homes, these institutions began switching to automated customer-access systems. After dialing a telephone number, a customer using such systems would be asked to enter an account number, or some other identifier. The user would enter the account number through the keys of a touch-tone keypad. As used herein, the term "identifier" refers to a string of characters that may comprise a plurality of letters, numbers, or both; based on this definition, an identifier may comprise either a random aggregation of characters, an actual word, or the name of a place or a person. Furthermore, as used herein, an identifier may comprise, but is not limited to, a string of characters for identifying a particular product, service, location, or account information.

Today, a user can provide such an identifier to an institution through a number of ways besides touch-tone telephony, including by speaking the identifier into the telephone handset. When the user is prompted to speak the identifier, the institution uses a speech recognition system to produce a recognized identifier based on the spoken identifier. Regardless of how the user enters the identifier, however, once a recognized signal representative of the input identifier has been received at the institution, the institution must match the recognized signal with one of a plurality of pre-stored identifiers, which are also referred to as reference identifiers. The complete set of reference identifiers is referred to as a grammar, or grammar domain. After a match between the input identifier and a reference identifier is found, the institution performs a transaction based on the matched reference identifier, such as retrieving account information or ordering a specific product. Finding such a match may take some time, however, since institutions often maintain thousands, if not millions, of reference identifiers. Moreover, the more reference identifiers that an institution must search through in order to find a match with an input identifier, the less accurate this search becomes, especially when the reference identifiers are alphanumeric, which tend to be confused with one another. Matching input identifiers with the wrong reference identifiers at least leads to delays and customer dissatisfaction, and perhaps also to erroneous billing or even to divulging sensitive, confidential information. What is therefore needed is a system that maintains a high degree of accuracy in matching input identifiers with reference identifiers, even when the total number of reference identifiers is quite large.

SUMMARY OF THE INVENTION

The present invention is directed to a method and apparatus for recognizing an input identifier provided by a user. After producing a recognized identifier based on the input identifier, the present invention compares the reference identifier with a set of reference identifiers maintained in memory. If a match is found between the recognized identifier and one of the reference identifiers, the user is prompted with the matched reference identifier. If the user confirms that the matched reference identifier does indeed match the input identifier, the present invention executes a particular transaction based on the matched reference identifier. If the user rejects the matched reference identifier, the present invention excludes the rejected reference identifier from the set of reference identifiers and compares the recognized identifier with the updated set of reference identifiers. The system repeats this process until the user confirms a matched reference identifier as corresponding to the input identifier, or until a predetermined number of reference identifiers have been excluded in the manner discussed above.

According to another embodiment of the present invention, when a user rejects a current matched reference identifier, the present invention excludes the current matched reference identifier and reinstates for further consideration any previously matched reference identifiers that were rejected by the user. Thus, if a user mistakenly rejects a correctly matched reference identifier, or if the system of the present invention misinterprets a user's confirmation of a matched reference identifier as a rejection instead, the present invention allows a mistakenly rejected reference identifier to be considered again in a subsequent comparison operation.

DETAILED DESCRIPTION

Figure 1:
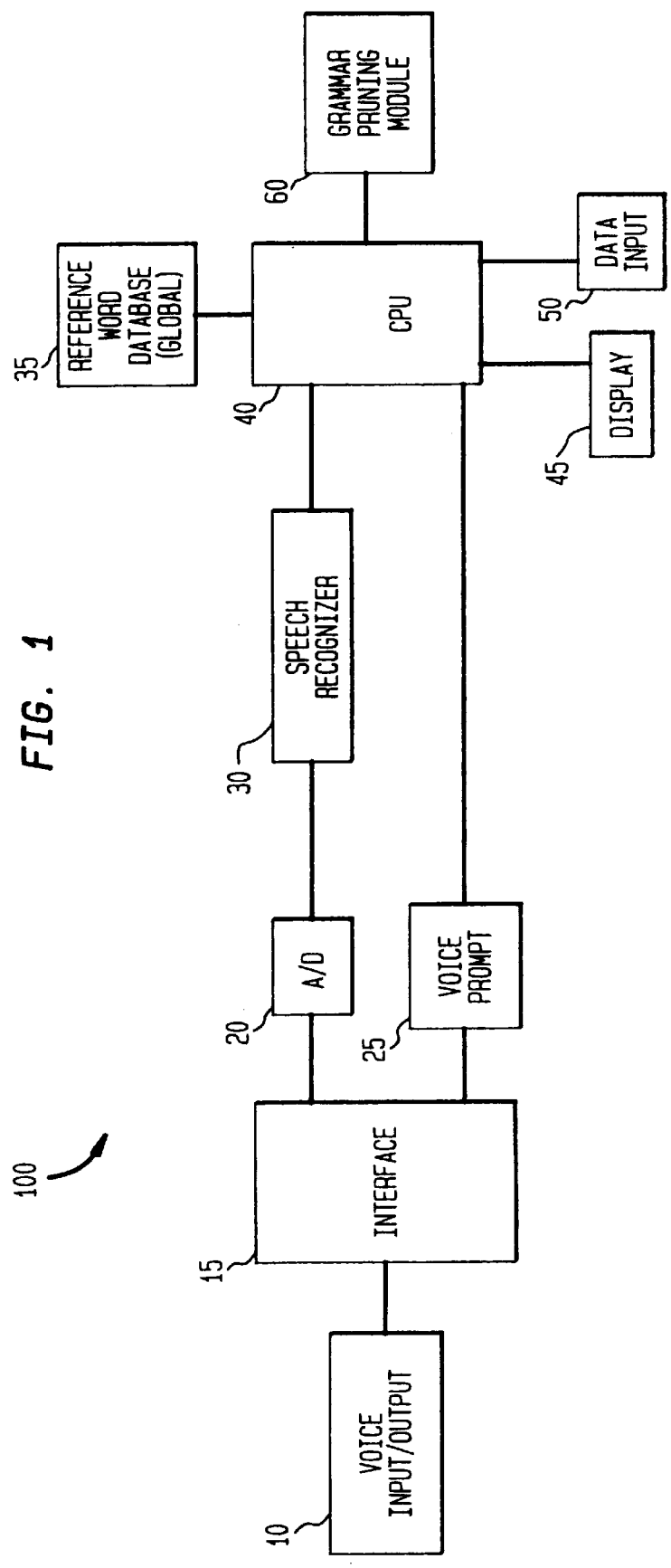
FIG. 1 illustrates a block diagram of the system of the present invention.

FIG. 1 illustrates a system that implements the grammar pruning routine of the present invention. The system of FIG.

1 is merely an example of one kind of system that is capable of supporting the present grammar pruning routine, and it should be appreciated that the present grammar pruning routine is compatible with numerous other applications.

The system 100 of FIG. 1 includes a voice input/output device 10, which may comprise a conventional telephone, or any other known device capable of converting an audible vocal signal to an electrical signal and vice versa. Connected to the voice input/output device 10 is an interface 15 that interfaces the voice input/output device 10 to the remaining components of system 100. The interface 15 may comprise a conventional public switched telephone network ("PSTN"). Of course, an interface is necessary only if the voice is to be transmitted to a remote location for processing; as an alternative, the components of system 100 may be provided in a unitary apparatus, save for the interface 15. The present invention is intended to encompass both types of systems. After the voice signal is converted to a digital signal by an analog-to-digital ("A/D") converter 20, the digitized voice signal is provided to a speech recognizer 30, which may comprise a HARK™ 3.0 recognizer, for example. After employing a speech recognition routine, which may, for example, be based on the Hidden Markov Model, speech recognizer 30 provides a recognized output that is intended to correspond to the information that the user spoke into the voice input/output device 10. This recognized output, which is in the form of a well-known digital code, is referred to as a recognized "identifier," and it is provided to an input of CPU 40. Coupled to CPU 40 are a grammar database 35, a grammar access module 45, along with a live operator station comprising display 50 and data input device 55. The system 100 also includes a voice prompt device 25, which provides, under the control of CPU 40, audible voice prompts that are intended to guide a user through the operation of system 100.

Although the principles of the present invention are discussed herein within the context of a speech recognition system, it should be appreciated that the present invention may also rely on touch-tone telephone signaling to produce the recognized identifier. In this type of system, a user would enter the characters of the identifier by manipulating an appropriate set of keys on a telephone handset. Speech recognizer 30 would be replaced by a device, commonly available in current touch-tone recognition systems, that would produce a recognized identifier based on the entered touch-tone signals.

Returning to the system 100 of FIG. 1, a user accesses system 100 through voice input/output device 10 by speaking a particular identifier of a first type into device 10. Using a recognized identifier that is based on the voice signal provided by the user, the system 100 then compares the recognized identifier with a pre-stored set of reference identifiers, which is maintained in grammar database 35. The reference identifiers maintained in database 35 are collectively referred to as a grammar. The reference identifiers stored in grammar database 35 may each comprise a combination of letters, numbers, or both. Further, the letters or numbers that constitute each of the reference identifiers may be arranged according to a predetermined format. For example, each reference identifier may comprise the format LLNNNE, in which the character positions identified by "L" are occupied by letters only, the character positions identified by "N" are occupied by numbers only, and the character position E may be occupied by either a letter or a number. The reference identifier "AE439J" would fit this format. Of course, the present invention is not limited to the aforementioned format, but instead encompasses any other format that is capable of arranging letters, numbers, or both according to a predetermined ordering.

Returning to the system 100, if the system 100 selects a reference identifier as a match for the recognized identifier provided by the user, the system 100 causes voice prompt device 25 to prompt the user with the selected reference identifier. Of course, the "match" that is selected by CPU 40 may be correct or incorrect, depending largely on whether speech recognizer 30 corectly recognized the input identifier. Therefore, due to the inability of speech recognizer 30 to function with 100% accuracy, the reference identifier selected by CPU 40 may not be a true match for the input identifier; at this point, therefore, the reference identifier selected for presentation to the user by CPU 40 cannot yet be considered a true match because it is no more than a putative match with respect to the input identifier. In order to confirm whether this putative match is a true match, the user is prompted to indicate whether the matched reference identifier corresponds to the identifier that the user spoke into the voice input/output device 10. The user can provide this response either vocally or, if the voice input/output device 10 comprises a conventional telephone, by manipulating an appropriate set of keys on the telephone. If the user responds that the matched reference identifier (i.e., the reference identifier selected by the CPU 40 as supposedly matching the input identifier) does not correspond to the input identifier provided by the user, CPU 40 eliminates from consideration the matched reference identifier in database 35. CPU 40 then compares the recognized identifier again to the reference identifiers of database 35, but this time, the comparison does not consider the previously matched reference identifier because it has been excluded from the set of reference identifiers. If the user confirms the matched reference identifier yielded by this iteration corresponds to the spoken identifier, the CPU 40 executes a transaction based on the matched reference identifier. For example, the matched reference identifier may identify a bank account belonging to the user, in which case CPU 40 would initiate some sort of bank-related transaction relating to the account, such as providing balance information, transferring funds, etc..

Figure 2:
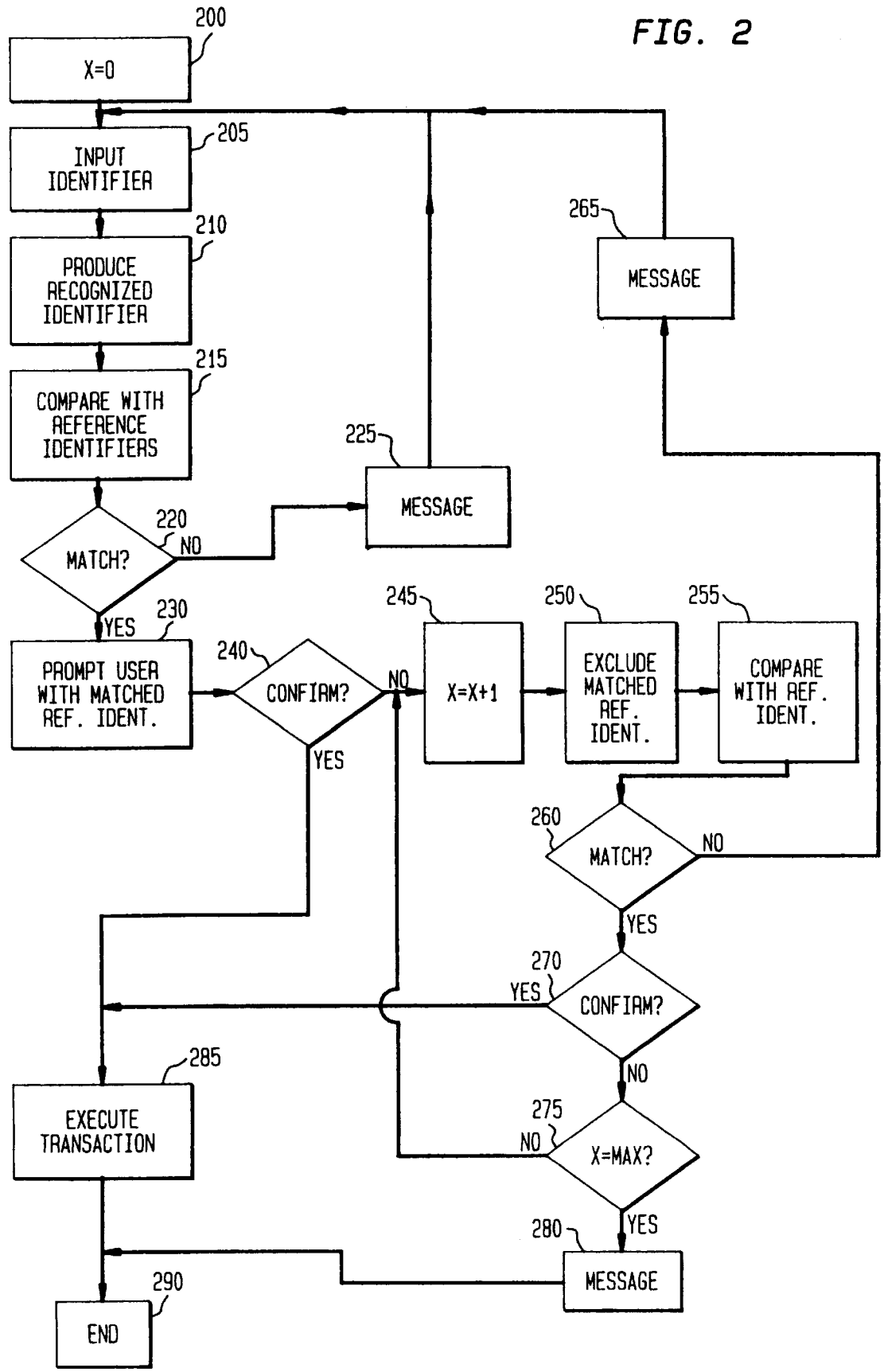
FIG. 2 illustrates a flow diagram according to a first embodiment of the present invention.

For a more complete discussion of the operation of the system 100, reference is now made to the flow diagram of FIG. 2, which presents an algorithm, maintained in grammar pruning module 45, under which CPU 40 operates. The operation of the system 100 begins with the initialization of the variable X to zero (step 200). The use of this variable shall be explained later on. Next, a user is prompted by voice prompt device 25 to speak a particular identifier, which may correspond, for example, to an account of some sort (step 205). After being converted to a digitized speech signal by A/D converter 20, the spoken identifier is supplied to recognizer 30, which produces a recognized identifier that is intended to correspond to the spoken identifier (step 210). CPU 40 then determines whether the recognized identifier matches any reference identifier maintained in database 35 (step 220). If CPU 40 finds no such match, CPU 40 causes voice prompt device 25 to issue to the user a message stating that the system 100 could not match the spoken identifier to a valid identifier (step 225). The message may also ask the user to repeat speaking the identifier, after which the comparison would begin anew. Alternatively, rather than re-prompt the user for the identifier, CPU 40 may instead connect the user to a live operator stationed at display 45 and data input device 50. The live operator verbally communicates with the user in order to obtain a valid identifier and consequently develop a transaction on the basis of the obtained, valid identifier. As a further alternative, if no match is found between the recognized identifier and the set of reference identifiers, CPU 40 may select the reference word that most closely matches the recognized word; this may be accomplished using any suitable technique for finding the closest matching reference identifier.

If CPU 40 finds a putative match between the recognized identifier and one of the reference identifiers of database 35, CPU 40 prompts the user with the selected reference identifier in order to allow the user to confirm or deny that the matched reference identifier does in fact correspond to the spoken identifier (step 230). As explained before, the user may provide this response through voice input/output device 10, or the user may provide such a response through a touch-tone keypad, if the voice input/output device 10 comprises a touch-tone telephone. If the user confirms that the matched reference identifier does indeed correspond to the spoken identifier, CPU 40 proceeds to execute a particular transaction on the basis of the matched reference identifier (step 290). At this point, the putative match selected by CPU 40 can, by virtue of the user's confirmation, be considered a true match. If the user, however, rejects the matched reference identifier, CPU 40 increments X by one and excludes the matched reference identifier from any further consideration (step 250). Being excluded from consideration does not necessarily mean that the matched reference identifier is erased from the database 35, although this is a possibility that is embraced within the scope of the present invention. Being excluded from consideration may also mean that the rejected, matched reference identifier is somehow segregated from the other reference identifiers that remain available for the next comparison with the recognized identifier. This segregation may be accomplished in any one of several suitable ways. One is to provide in database 35 a comparison data area into which each reference identifier that is to be compared to the recognized identifier is sent; when a user first provides an identifier, all of the reference identifiers of database 35 are sent to this data area for comparison. But as reference identifiers are excluded from consideration, these excluded reference identifiers no longer are provided to the comparison data area for comparison to the recognized identifier. Thus, using this comparison data area ensures that the recognized identifier will not be matched again by CPU 40 to any reference identifier previously rejected by the user. Another way to exclude reference identifiers from further consideration is to associate a data field or flag with each particular reference identifier in database 35. When the data field contains a first particular value (e.g., 1), the associated reference identifier is available for comparison with the recognized identifier. When the data field contains another particular value (e.g., 0), the associated reference identifier is excluded from being compared with the recognized identifier. Thus, when the user rejects a matched reference identifier, the value of the associated data field is changed from a "1" to a "0"; since CPU 40 in this situation is programmed to compare the recognized identifier only to reference identifiers associated with a data field having a value of "1", any previously rejected reference identifier will not be compared again to the recognized identifier.

Returning to FIG. 2, after the matched reference identifier is excluded in step 250, CPU 40 compares the recognized identifier to the current set of reference identifiers, which does not include the excluded reference identifier (step 255). If no match occurs (step 260), CPU 40 may be programmed to cause voice prompt device 25 to issue a message to the user explaining that no match was found and requesting a re-entry of the identifier through voice input/output device 10. As an alternative, the user may instead be transferred to a live operator if no match is found between the recognized identifier and the reference identifiers.

If a match is found, however, the user is prompted with the latest matched reference identifier for confirmation (step 270). If the user indicates through voice input/output device 10 that the latest matched reference identifier does not correspond to the spoken identifier, CPU 40 determines whether the variable X has achieved a maximum value MAX (step 275). Achieving this maximum value signifies that the recognized identifier has been repeatedly compared MAX times to the ever-shrinking set of reference identifiers, which have been repeatedly reduced by one reference identifier for each comparison. If X=MAX, CPU 40 issues a message explaining that no match could be found (step 280); subsequently, the user may be transferred to a live operator for further interaction with system 100.

If X does not equal MAX, then CPU 40 eliminates the current matched reference identifier from further consideration in the manner discussed above (step 250). CPU then compares the recognized identifier to the currently available reference identifiers (step 255). This process repeats itself until X=MAX, CPU 40 cannot match the recognized identifier with any of the current recognized identifiers, or the user confirms that a matched reference identifier corresponds to the spoken identifier.

It should be appreciated that the recognized identifier need not be repeatedly compared with the reference identifiers until a match is confirmed by the user. Instead, the current recognized identifier may be discarded if the user rejects the matched reference identifier yielded by the current iteration. Once the user rejects a particular matched reference identifier, instead of using the same recognized identifier in a subsequent comparison with the reference identifiers, CPU 40 may instead require that each time a user rejects a reference identifier, the user be prompted to repeat speaking the identifier into the voice input/output device. Thus, in this situation, CPU 40 is provided with a new recognized identifier every time the user rejects a matched reference identifier.

Figure 3:
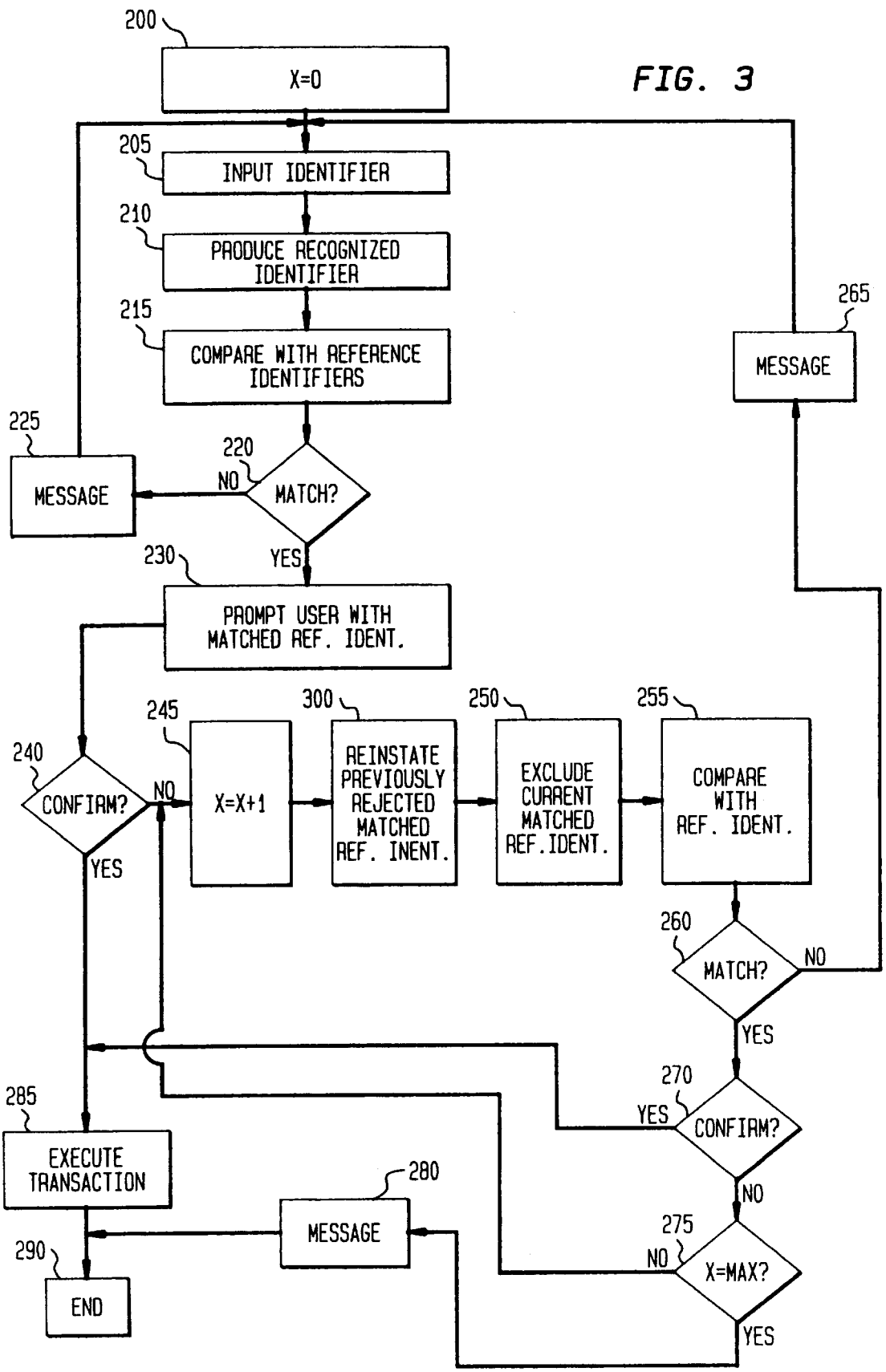
FIG. 3 illustrates a flow diagram according to a second embodiment of the present invention.

FIG. 3 illustrates a flow diagram that corresponds to another embodiment of the present invention. This embodiment addresses the situation when a user intends to confirm that a matched reference identifier is truly a match for the input identifier, but the system 100 interprets the intended confirmation as a rejection instead. In order to address this situation, grammar pruning module 60 is programmed to cause CPU 40 to reinstate a previously rejected matched reference identifier when the currently matched reference identifier has been rejected. The possibility of reinstatement includes those matched reference identifiers for which the user provided a confirmation, but which the system 100 misinterpreted as a rejection. The possibility of reinstatement also covers the situation when a user who is presented with a correctly matched reference identifier inadvertently responds with a rejection instead of a confirmation. The steps of FIG. 3, save for one, are the steps of FIG. 2. The only step in FIG. 3 that is not found in FIG. 2 is step 300, which requires a previously rejected matched reference identifier to be reinstated for consideration if a currently matched reference identifier is rejected.

To illustrate the operation of the system 100 in accordance with the algorithm of FIG. 3, assume that the user speaks into voice input/output device 10 the identifier "AH645P". Next, after a recognized identifier based on the spoken identifier is generated, assume that in step 220, CPU 40 finds a match between the recognized identifier and a reference identifier corresponding to "AH645P". In this example, when the user is prompted with the correct matched reference identifier, the user either mistakenly rejects the correct reference identifier, or the system 100, because of some malfunction or glitch, misinterprets the user's positive confirmation as a rejection. In either situation, the result is that the correct reference identifier has been erroneously rejected. In step 300, no reinstatement yet occurs because only one reference identifier has been rejected so far for this caller. In step 250, the reference identifier AH645P is excluded from consideration. After comparing the recognized identifier to the currently available reference identifiers (step 255), CPU 40 yields another match (step 260), this time reference identifier "HA645P". Of course, reference identifier "HA645P" does not truly match identifier "AH645P"; instead, what is meant by the term "match" in this situation is a reference identifier that has been selected by CPU 40 for presentation to the user for confirmation or rejection. When presented with this current matched reference identifier, the user rejects it (step 270), with the result that CPU 40 reinstates the previously rejected reference identifier AH645P (step 300) and excludes from consideration reference identifier HA645P (step 250). The method of reinstatement can be the mirror opposite of the method of excluding reference identifiers. That is, when a reference identifier is to be reinstated, reinstatement may involve changing the value of the above-mentioned associated data field from an inactive status (e.g., 0) to an active status (e.g., 1). Alternatively, reinstatement may involve restoring the previously rejected reference identifier to the comparison data area of database 35.

Returning to FIG. 3, after reference identifier AH645P is reinstated, when CPU 40 compares the recognized identifier to the current reference identifiers (step 255), it selects reference identifier AH645P as again matching the recognized identifier (step 260). When prompted with this reference identifier, the user is presented with a second chance to confirm the correctness of the matched reference identifier. Thus, the algorithm of FIG. 3 provides the opportunity to obtain the correct reference identifier even if it was first inadvertently or incorrectly rejected previously.

While the principles of the present invention have been presented within the context of system that executes desired transactions on the basis of retrieved account information, it should be appreciated that this exemplary embodiment was presented not by way of limitation, but for illustrative purposes. Consequently, it should also be appreciated that the present invention is broadly applicable to a wide variety of environments that require a system to receive input information and automatically select a pre-stored or self-generated set of information that corresponds to the input information. For example, instead of being used to retrieve particular account information, the present invention may be used to identify particular articles of commerce in a merchandising system. What the present invention achieves in these various operating environments is a higher degree of accuracy than previous systems in matching an input identifier with a reference identifier, even when the total amount of reference identifiers is substantially large.

What is claimed is:

1. A method of recognizing an input identifier, comprising:
   a) providing a recognized identifier based on the input identifier;
   b) comparing the recognized identifier to a current set of reference identifiers;
   c) determining a reference identifier from the current set of reference identifiers that matches the recognized identifier;
   d) prompting a user with the matched reference identifier;
   e) excluding, if the user rejects the matched reference identifier, the matched reference identifier from the current set of reference identifiers to create a new current set of reference identifiers;
   f) repeating steps b) to e) so long as the user indicates that a current matched reference identifier does not correspond to the input identifier; and
   g) ceasing step f) if a predetermined number of reference identifiers are excluded from the set of reference identifiers, wherein each rejected matched reference identifier is excluded from the current set of reference identifiers while steps b) through e) are being performed.

2. The method according to claim 1, further comprising the step of:
   executing a transaction if the user confirms that at least one matched reference identifier corresponds to the input identifier.

3. The method according to claim 1, wherein, if the recognized identifier does not match any reference identifier of the set of reference identifiers, the method further comprises the step of:
   providing at least one of an error message to the user and a connection to a live operator.

4. The method according to claim 1, wherein the step e) comprises:
   rendering the rejected reference identifier into an inactive state.

5. The method according to claim 1, wherein the step e) comprises:
   excluding the rejected reference identifier from a comparison data area of a memory for storing the set of reference identifiers.

6. A method of recognizing an input identifier, comprising:
   a) providing a recognized identifier based on the input identifier;
   b) comparing the recognized identifier to a current set of reference identifiers;
   c) determining a reference identifier from the current set of reference identifiers that matches the recognized identifier;
   d) prompting a user with the matched reference identifier;
   e) excluding, if the user rejects the matched reference identifier, the matched reference identifier from the current set of reference identifiers to create a new current set of reference identifiers;
   f) reinstating into the new current set of reference identifiers at least one of a previously rejected reference identifier;
   g) repeating steps b) to f) so long as the user indicates that a current matched reference identifier does not correspond to the input identifier; and
   h) ceasing step g) if a predetermined number of reference identifiers are excluded from the set of reference identifiers, wherein each rejected matched reference identifier is excluded from the current set of reference identifiers while steps b) through f) are being performed.

7. The method according to claim 6, further comprising the step of:

executing a transaction if the user confirms that at least one matched reference identifier corresponds to the input identifier.

8. The method according to claim 6, wherein, if the recognized identifier does not match any reference identifier of the set of reference identifiers, the method further comprises the step of:

providing at least one of an error message to a user and a connection to a live operator.

9. The method according to claim 6, wherein the step e) comprises:

rendering the rejected reference identifier into an inactive state.

10. The method according to claim 6, wherein the step e) comprises:

excluding the rejected reference identifier from a comparison data area of a memory for storing the set of reference identifiers.

11. The method according to claim 6, wherein the step f) comprises:

rendering the at least one previously rejected reference identifier into an active state.

12. The method according to claim 6, wherein the step f) comprises:

reinstating the at least one previously rejected reference identifier into a comparison data area of a memory for storing the set of reference identifiers.

13. An apparatus for recognizing an input identifier, comprising:

a) means for providing a recognized identifier based on the input identifier;

b) means for comparing the recognized identifier to a current set of reference identifiers;

c) means for determining a reference identifier from the current set of reference identifiers that matches the recognized identifier;

d) means for prompting a user with the matched reference identifier;

e) means for excluding, if the user rejects the matched reference identifier, the matched reference identifier from the current set of reference identifiers to create a new current set of reference identifiers; and f) means for selecting, if the user confirms the matched reference identifier, the matched reference identifier as corresponding to the input identifier, wherein each rejected matched reference identifier is excluded from the current set of reference identifiers before a completion of an operation of one of the means for comparing, the means for determining, the means for prompting, and the means for excluding.

14. The apparatus according to claim 13, further comprising:

means for executing a transaction if the user confirms that at least one matched reference identifier corresponds to the input identifier.

15. The apparatus according to claim 13, further comprising:

means for providing at least one of an error message and a connection to a live operator.

16. The apparatus according to claim 13, wherein the means for excluding comprises:

means for rendering the rejected reference identifier into an inactive state.

17. The apparatus according to claim 13, wherein the means for excluding comprises:

means for excluding the rejected reference identifier from a comparison data area of a memory for storing the set of reference identifiers.

18. An apparatus for recognizing an input identifier, comprising:

a) means for providing a recognized identifier based on the input identifier;

b) means for comparing the recognized identifier to a current set of reference identifiers;

c) means for determining a reference identifier from the current set of reference identifiers that matches the recognized identifier;

d) means for prompting a user with the matched reference identifier;

e) means for excluding, if the user rejects the matched reference identifier, the matched reference identifier from the current set of reference identifiers to create a new current set of reference identifiers;

f) means for reinstating into the new current set of reference identifiers at least one of a previously rejected reference identifier; and g) means for selecting, if the user confirms the matched reference identifier, the matched reference identifier as corresponding to the input identifier, wherein each rejected matched reference identifier is excluded from the current set of reference identifiers before a completion of an operation of one of the means for comparing, the means for determining, the means for prompting, the means for excluding, and the means for reinstating.

19. The apparatus according to claim 18, further comprising:

means for executing a transaction if the user confirms that at least one matched reference identifier corresponds to the input identifier.

20. The apparatus according to claim 18, further comprising:

means for providing at least one of an error message and a connection to a live operator.

21. The apparatus according to claim 18, wherein the means for excluding comprises:

means for rendering the rejected reference identifier into an inactive state.

22. The apparatus according to claim 18, wherein the means for excluding comprises:

means for excluding the rejected reference identifier from a comparison data area of a memory for storing the set of reference identifiers.

23. The apparatus according to claim 18, wherein the means for reinstating comprises:

means for rendering the at least one previously rejected reference identifier into an active state.

24. The apparatus according to claim 18, wherein the means for reinstating comprises:

means for supplying the at least one previously rejected reference identifier to a comparison data area of a memory for storing the set of reference identifiers.

25. An apparatus for recognizing an input identifier, comprising:

a processing device;

a recognizing device coupled to the processing device, the recognizing device including an input for receiving the input identifier;

a global database coupled to the processing device, the global database including at least one reference identifier; and a grammar pruning module coupled to the processing device, the grammar pruning module causing each reference identifier that is rejected to be excluded from active status during an operation of the processing device.

26. The apparatus according to claim 25, wherein the global database includes a comparison data area.

27. The apparatus according to claim 25, wherein each reference identifier included in the global database is associated with a data field indicative of a status of the associated reference identifier.

28. The apparatus according to claim 25, further comprising:

a data input device coupled to the processing device; and a display device coupled to the processing device.

* * * * *